Patented Nov. 4, 1947

2,429,996

UNITED STATES PATENT OFFICE 2,429,996

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application April 2, 1945, Serial No. 586,262

9 Claims. (Cl. 252—341)

This invention relates primarily to the resolution of petroleum emulsions.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions, which have been prepared under controlled conditions from mineral oil, such as crude oil and relatively soft waters or weak brines. Controlled emulsification and subsequent demulsification, under the conditions just mentioned, is of significant value in removing impurities, particularly inorganic salts from pipeline oil.

Demulsification, as contemplated in the present application, includes the preventive step of commingling the demulsifier with the aqueous component, which would or might subsequently become either phase of the emulsion in absence of such precautionary measure. Similarly, such demulsifier may be mixed with the hydrocarbon component.

The new material or composition of matter herein described consists of a hydrophile pyridine compound of the formula:

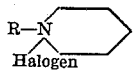
Halogen in which R is the radical obtained by the removal of an alpha-hydrogen atom from the acid radical of a low molal carboxy acid ester of a phenoxyalkanol of the formula:

$$R_1O(R_2O)_nH$$

in which $R_1$ is a monocyclic phenol radical having at least 2 and not more than 3 alkyl side chains, at least 2 of which contain at least 3 carbon atoms and the longest of which does not contain more than 8 carbon atoms, with the proviso that the number of carbon atoms in the side chains must total at least 9; $R_2O$ is an alkylene oxide radical containing at least 2 and not more than 4 carbon atoms and selected from the class consisting of ethylene oxide, propylene oxide, butylene oxide, glycide and methylglycide radicals; and $n$ is a small whole number varying from 1 to 3, or even 4 or 5, or more—for instance, 6.

More specifically, the ester derived from a phenoxyalkanol includes alkanols in which the carbon atom chain is interrupted at least once by oxygen; i. e., etheralkanols or etheralcohols. Thus, R, in the first formula of the text, represents the monovalent radical by elimination of halogen from the ester of the formula:

$$R_1O(R_2O)_nOOC.R_3 \text{ Halogen}$$

in which all the symbols have their prior significance, and $OCR_3$ Halogen is the acyl radical of a low molal alphachloromonocarboxy acid, such as chloroacetic acid. In other words, repeating the previous example with specific reference to chloroacetic acid, the formula becomes:

$$R_1O(R_2O)_nOOC.CH_2Cl$$

Briefly stated, the preparation of our new material or composition of matter contemplates three steps: In the first step a properly selected phenol of the kind typified by the formula $R_1OH$ is treated with 1 to 3 moles or even 4 or 5 moles of an oxyalkylating agent of the kind described, or, at least sufficient to insure at least incipient hydrophile properties in the final compound, so as to produce a phenoxyalkanol; employing ethylene oxide as an example, the reaction may be illustrated in the following manner:

$$R_1OH + C_2H_4O \rightarrow R_1OC_2H_4OH$$

The second step consists in esterifying the alcohol thus obtained with a suitable alpha-chloromonocarboxy acid, such as chloroacetic acid, so as to form the corresponding ester. This reaction may be illustrated in the following manner:

The third or final step consists in reacting the ester so obtained with pyridine, or one of its homologs, as subsequently specified. Such reaction may be shown in the following manner:

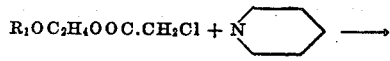

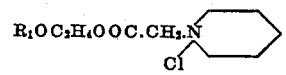

As suggested, one may not only use pyridine, but other homologs of pyridine, that is, members of the pyridine series. For instance, members of the pyridine series suitable as reactants include pyridine, alkylated derivatives of pyridine, particularly alkylated derivatives, in which the alkyl radical contains three carbon atoms or less, and especially methylated pyridines, i. e., pyridines, in which 1, 2, or 3 methyl groups have been substituted in the nucleus, such as picolines, lutidines and collidines. Also suitable as reactants are the comparable quinolines and isoquinolines, along with C-linked methyl homologs thereof. Coal tar bases represent mixtures of suitable heterocyclic materials which may be used as such, or after suitable purification, without separation into the individual components.

While chloroacetic acid or chloroacetyl chloride is the preferred halogen carboxylic acid compound, other halogen acids, halogen-substituted acyl halides, and esterifying derivatives are suitable, particularly a-halogen carboxylic acids of not over six carbon atoms. When the halogen is in the a-position to the CO group, the reaction seems to go with greater readiness. With the shorter chain esterifying halogen carboxylic acids or their functional equivalents, especially chloroacetyl chloride, the reaction goes with great ease. Other halogen acylating compounds which are suitable are, for example, a-chloropropionic acid, etc., but especially any acid of the formula:

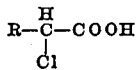

where R is a hydrogen atom or a methyl, ethyl or butyl radical.

Substituted phenols of the kind contemplated for reaction, in preparation of the herein described compounds, include, among others, di(tertiary)amylphenol, diheptylphenol; dioctylphenol-(di-diisobutylphenol); 2,3-dimethyl-4,6-di-tert-butylphenol; 2-ethyl-4,6-di-tert-butylphenol; 2-methyl-4,6-di-tert-butylphenol; 3-ethyl-4,6-di-tert-butylphenol; 4-ethyl-2,6-di-tert-butylphenol; 4-methyl-2,6-di-tert-amylphenol; 2,4-dipropylphenol and 2,4,6-tri-tert-butylphenol.

Treatment of water-insoluble phenols with alkylene oxides of the kind enumerated, and particularly with ethylene oxide, propylene oxide and butylene oxide, is a well-known procedure. Such compounds are frequently oxyethylated so as to render them water-soluble. In the present instance instead of treating one mole of the selected phenol with a large ratio of oxyalkylating agent, one employs instead a comparatively low ratio, as indicated by the value for the letter n in prior formulas. In other words, one treats the phenol with 1 mole, 2 moles, or 3 moles, or even more moles of the oxyalkylating agent. The product so obtained is still distinctly water-insoluble to the extent that it will not yield a sol or solution, and this is also true of the ester derived therefrom. The ester is invariably even less water-soluble. It is to be noted, however, that such water-insoluble, or partially soluble, product represents the initial oxyalkylation step in the same type of procedure employed to produce a water-soluble product, or, at least, a product of distinctly hydrophile properties. Thus, as an example of various patents which teach the oxyalkylation of water-insoluble phenols including the stepwise addition of the oxyalkylating agent, attention is directed to the following: British Patent No. 470,181, British Patent No. 452,866, U. S. Patent No. 2,243,330, dated May 27, 1941, to De Groote & Keiser, and U. S. Patent No. 2,233,381, dated February 25, 1941, to De Groote and Keiser.

Having obtained a water-insoluble phenoxyalkanol, or one that is somewhat hydrophile, such product is esterified with chloroacetyl chloride, chlorcacetic acid, bromoacetic acid, alpha-chloropropionic acid, alpha-chlorobutyric acid, or the like. Such reaction, particularly between the acid itself, as differentiated from the acylchloride, is simply an esterification reaction, with the elimination of water, and is preferably carried out in the presence of an inert solvent insoluble in water, which serves to remove the water of formation. Such procedure is illustrated by numerous patents, including the following: British Patent No. 500,765; U. S. Patent No. 1,732,392, dated October 22, 1929, to Wietzel, and U. S. Patent No. 2,264,759, dated December 2, 1941, to Jones.

Having obtained the ester, it is reacted with pyridine or a pyridine homolog. This reaction takes place readily by merely refluxing, in the presence of an excess of pyridine, and subsequently removing the excess of pyridine which does not enter the reaction by distillation and preferably vacuum distillation. The herein described procedures are illustrated by the following examples:

PHENOXYALKANOL

*Example 1*

One pound mole of tri-isobutylphenol

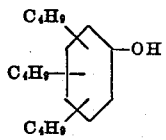

is treated with 44 pounds of ethylene oxide in the presence of approximately three-fourths of a pound of suspended sodium methylate. As the reaction proceeds, the sodium methylate either dissolves or is converted into a soluble compound by chemical combination. Reaction is conducted at approximately 125° C. and 100–250 pounds gauge pressure for approximately an hour and a half to two and one-half hours, until the reaction appears to be complete, as evidenced by the pressure dropping to zero.

PHENOXYALKANOL

*Example 2*

One pound mole of the phenoxyalkanol described in the preceding example is reacted with an additional portion of ethylene oxide (approximately 44 pounds) and this reaction is conducted at approximately 110° C. with a gauge pressure of approximately 100 pounds, until all of the ethylene oxide is absorbed. Time required for reaction is approximately the same as required in previous example.

PHENOXYALKANOL

*Example 3*

The same procedure is repeated as in the prior example, except that 2 pound moles of ethylene oxide, to wit, 88 pounds, are employed and the period of time required to complete the reaction may vary from approximately 1 hour to about 3 hours. Further oxyethylation, for instance, the use of another 88 pounds of ethylene oxide, may be required to give a distinct hydrophile effect in the final compound.

PHENOXYALKANOL

*Example 4*

One pound mole of 2,4-di(tertiary)amylphenol is reacted in the same manner as in the 3 prior examples, with ethylene oxide, so as to produce compounds having the following composition:

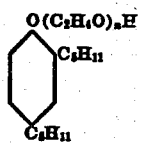

in which $n$ varies from 1 to 3.

PHENOXYALKANOL

Example 5

A mixture of 2-methyl-4-diisobutylphenol, 3-methyl-4-diisobutylphenol, and 4-methyl-2-diisobutylphenol obtained by the alkylation of cresols with diisobutylene, is reacted in the manner previously described in Examples 1, 2 and 3. (Diisobutylene is a mixture of 2 isomers, 2,4,4-trimethyl-1-pentene and 2,4,4-trimethyl-2-pentene which are assumed to give identical alkylation products.)

PHENOXYALKANOL

Example 6

The same procedure is followed as in the preceding five examples, except that propylene oxide or butylene oxide is substituted for ethylene oxide. Glycide may be employed to enhance the hydrophile property of the final product, if desired. As suggested by the patents previously referred to in regard to oxyethylation, such less active oxyalkylating agents require a somewhat higher temperature, for instance, a maximum of 200° C. and a somewhat higher pressure, for instance, a maximum of 300 pounds, and a somewhat longer period of reaction, for instance, approximately twice the period of time required for ethylene oxide.

Previous reference has been made to the fact that the esterification step is carried out in the conventional manner, preferably in the presence of an inert solvent. This simply means that the reactants, to wit, the acid, such as chloroacetic acid, and the phenoxyalkanol, are mixed in equimolar proportions, in the presence of a solvent in which both are soluble, such as xylene, cymene, decalin, or the like. The mixture is refluxed at some suitable temperature, above 100° C. and below 200° C., so that water of formation resulting from the esterification reaction is carried over as a constant boiling mixture. Such mixed vapor is condensed in the customary manner, so the water is trapped off, measured and then discarded and the solvent returned to the reaction vessel for further use. Ordinarily, such reactions are catalyzed by the addition of an acidic catalyst, such as toluene sulfonic acid, a cresyl phosphoric acid, dry hydrochloric acid, trichloroacetic acid, or the like. Insofar that the alpha-chlorocarboxy acids show marked acidity, in comparison with the unchlorinated carboxy acids, the reaction may be conducted without an added catalyst, if desired, or in the presence of an added catalyst, such as one-half percent to 1% of toluene sulfonic acid. Such catalyst tends to discolor the final product, but this is often immaterial, as, for example, when the product is used as a demulsifier. The entire procedure is too well known to require further elaboration, but is illustrated by the following examples:

ESTER

Example 1

One pound mole of the phenoxyalkanol described in "Phenoxyalkanol, Example 1," preceding, is mixed with one pound mole of alpha-chloroacetic acid and the mixture refluxed with an appropriate trap for the removal of one pound mole of water at a temperature of approximately 155° C. to 225° C. The time required is usually 3 to 10 hours. The resultant is a dark colored liquid.

ESTER

Example 2

The same procedure is followed as in the preceding example, except that phenoxyalkanols, exemplified by "Phenoxyalkanol, Examples 2 to 6," inclusive, are substituted for the phenoxyalkanol employed in the preceding example.

ESTER

Example 3

The same procedure is employed as in the two preceding examples, except that a-chloropropionic acid is substituted for alpha-chloroacetic acid.

ESTER

Example 4

Chloroacetylchloride is substituted for chloroacetic acid. The reaction starts to take place rapidly between 45° C. and 80° C. and the temperature should be controlled so the reaction takes place at the lowest suitable temperature. The acyl chloride should be added slowly to the phenoxyalkanol, with constant and vigorous agitation. Hydrochloric acid is formed and should be vented and disposed of in a suitable manner. If the reaction does not take place promptly, the temperature should be raised moderately, for instance, 5° to 15° C., or a bit higher, until the reaction proceeds smoothly. However, as soon as the reaction does start, the temperature should be lowered until the reaction proceeds at the slowest feasible rate. Generally, this means use of proper cooling devices, or controlled slow addition of the acyl chloride. Completeness of the reaction can be determined in any suitable manner, such as a check on the amount of hydrochloric acid eliminated, or the drop in hydroxyl value of the reactant mixture. When the reaction is complete, any hydrochloric acid gas dissolved in the reaction mass should be eliminated by passing an inert gas, such as carbon dioxide, through the mixture.

Having obtained an ester of the kind exemplified by the previosu examples, or the bromo derivative instead of the chloro derivative, the next step simply involves reaction with pyridine or a pyridine homolog of the kind previously described. The reaction takes place fairly rapidly, and usually is complete within four to 20 hours, particularly if an excess of pyridine is employed. The esters previously described are invariably viscous or semi-solid masses, which are soluble in pyridine without difficulty.

QUATERNARY PYRIDINIUM HALIDE

Example 1

One pound mole of the ester described in "Ester, Example 1," preceding, is refluxed with constant stirring, with several pound moles of technically pure pyridine. The reaction is conducted from approximately 4 to 20 hours, at a temperature in excess of 115° C., or thereabouts, until reaction is complete. Completeness of the reaction can be determined by distilling the uncombined pyridine from a sample and noting, by difference, percentage of pyridine which has been combined. Another suitable test is the determination of ionizable halogen, for instance, chlorine. It is to be noted that the reaction converts a non-ionizable halogen atom to an ionizable atom. When the reaction is complete, the excess of pyridine is removed by continuing the stirring and employing vacuum, so as to give a substantially solid or highly viscous, dark-colored mass. This reaction product should show distinct hydrophile properties.

QUATERNARY PYRIDINIUM HALIDE

*Example 2*

The same procedure is followed as in Example 1, preceding, except an ester exemplified by "Ester, Example 2" and "Ester, Example 3," preceding, is substituted for the ester employed in the previous example.

QUATERNARY PYRIDINIUM HALIDE

*Example 3*

The same procedure is followed as in immediately preceding Examples 1 and 2, but instead of using technically pure pyridine, one employs a commercial pyridine, in which there is present some monomethylpyridine and dimethylpyridine, in addition to unsubstituted pyridine.

The new materials or compositions of matter herein described, form the subject-matter of our co-pending divisional application Serial No. 630,977, filed November 26, 1945.

Conventional demulsifying agents employed in the treatment of oil field emulsions, are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our herein described process for resolving petroleum emulsions may be admixed with one or more of the solvents customarily used in connection with conventional demulsifying agents. Moreover, said material or materials may be used alone, or in admixture with other suitable well-known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. Sometimes they may be used in a form which exhibits relatively limited oil solubility. However, since such reagents are sometimes used in a ratio of 1 to 10,000 or 1 to 20,000, or even 1 to 40,000, or 1 to 50,000, in desalting practice, such an apparent insolubility in oil and water is not significant because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process for resolving petroleum emulsions of the water-in-oil type, a treating agent or demulsifying agent of the kind above described is brought into contact with or caused to act upon the emulsion to be treated, in any of the various ways or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said fluids. This particular type of application is decidedly feasible, when the demulsifier is used in connection with acidification of calcareous oil-bearing strata, especially if suspended in or dissolved in the acid employed for acidification.

A somewhat analogous use of our demulsifying agent is the removal of a residual mud sheath which remains after drilling a well by the rotary method. Sometimes the drilling mud contains added calcium carbonate or the like to render the mud susceptible to reaction with hydrochloric acid or the like, and thus expedite its removal.

Reference is made to the fact that the materials, compounds or products herein contemplated are hydrophile in nature, and may vary from self-emulsifiable products through the range that gives a colloidal sol, and into the final range of products which give clear solutions. Obviously, as the number of side chains in the phenolic nucleus increases, and as their length increases, the hydrophobic character both of the phenol and subsequent derivatives have been increased. If the pyridinium compound obtained from any particular experiment does not show significant hydrophile character, then such hydrophile character can be obtained by the very simple expedient of increasing the repetitious ether linkage, and particularly, by using ethylene oxide or glycide, for example, or methylglycide, in preference to propylene oxide or butylene oxide. Everything else being equal, the fewer the alkyl side chains, the shorter the length of the alkyl side chains, the lower the molecular weight of the alpha-chloromonocarboxy acid radical, and the lower the molecular weight of the pyridine type of compound, the greater the hydrophile effect. With these obvious factors in mind, there is no difficulty in obtaining a compound having at least distinct hydrophile properties, and it may, in fact, as noted, be completely water-soluble. See what is said subsequently as to the hydrophile property being affected by the salt-like structure.

One preferred and more narrow aspect of our invention, insofar as it is concerned with demulsification of petroleum emulsions of the water-in-oil type, is concerned with the admixture of the aminoester, as described, with a viscosity-reducing solvent, such as the various solvents enumerated, particularly aromatic solvents, alcohols, ether alcohols, etc., as previously specified. The word "solvent" is used in this sense to refer to the mixture, if more than one solvent is employed, and generally speaking, it is our preference to employ the demulsifier in a form representing 40% to 85% demulsifier and 15% to 60% solvent, largely, if not entirely, non-aqueous, and so selected to give a solution or mixture particularly adaptable for proportional pumps or other measuring devices. The following examples will illustrate the aspect of our invention:

DEMULSIFIER

Example 1

| | Per cent |
|---|---|
| Quaternary pyridinium halide, Example 1 | 60 |
| Xylene | 30 |
| Methyl alcohol | 10 |

DEMULSIFIER

Example 2

| | Per cent |
|---|---|
| Quaternary pyridinium halide, Example 2 | 65 |
| Commercial cresol | 25 |
| Isopropyl alcohol | 10 |

DEMULSIFIER

Example 3

| | Per cent |
|---|---|
| Quaternary pyridinium halide, Example 3 | 55 |
| Decalin | 10 |
| Cymene | 10 |
| Dichloroethyl ether | 25 |

The above percentages are by weight.

In many instances, the materials obtained, rather than being characterized as a viscous semi-solid, probably should be referred to as tacky sub-resin or tacky resin. The phenoxyalkanol-chloroacetic acid ester or its equivalent, shows not only viscosity, but tackiness approaching or actually in the stringy state. This particular property is usually enhanced after conversion into a pyridinium compound. This enhancement applies usually to both the stringy character and the resinous character. Such change appears to be imparted by the fact that the large molecular structure still exists, but in addition, an ionic structure has been superimposed on the bottom molecular structure. This ionic structure naturally acts the same as such structure would act in an ordinary inorganic salt cystal. One result of such peculiarity is that some times water solubility and the hydrophile property in general may be obscure. For instance, tests have been indicated previously which are employed to show when the reaction with pyridine has gone to completion. Upon completion, the structure of the resultant may be so resinous and so tacky that it shows a very slow rate of solubility in water. Thus, a test may, at first sight, indicate the product is still water-insoluble, whereas, it is actually water-soluble, or at least, self-emulsifiable. To guard against such possible error, it is well to take a small amount of the reaction mass and reflux it with an excess of water, or better still, dissolve the reaction mass by warming in methyl alcohol and then dilute with an excess of water.

This same feature merits consideration in the manufacture of the foregoing demulsifiers. If the demulsifying mixture, as exemplified by "Demulsifier, Examples 1, 2 and 3," preceding, does not form a homogeneous mixture, in combination with the indicated solvents, then methyl alcohol should be added until a homogeneous mixture is obtained. Sometimes a mixture of 50% water and 50% methyl alcohol is even better. The basic principle involved is that these products are polar or ionic, and their solution is accelerated by the presence of a polar solvent.

Oddly enough, however, in light of the enormous hydrophile radical present in their structure, their solution may also be accelerated by a comparatively non-polar solvent, such as kerosene, or a semi-polar solvent, such as cresylic acid.

Polar solvents yield both dilute and concentrated solutions, sols or homogeneous mixtures, whereas, non-polar and semi-polar solvents may only yield comparatively concentrated solutions or sols, in some instances.

Attention is directed to our co-pending applications for Patent Serial Nos. 630,973, 690,974, 630,977 and 630,978, filed November 26, 1945.

Having thus described our invention, what we claim as new and desire to secure by Letters Patent is:

1. A process for breaking petroleum emulsions of the water-in-oil type, characterized by subjecting the emulsion to the action of a demulsifier comprising a hydrophile compound of the formula:

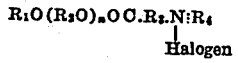

in which $R_1$ is a monocyclic phenol radical having at least 2 and not more than 3 alkyl side chains, of which at least 2 contain at least 4 carbon atoms; the longest side chain of the nucleus $R_1$ shall not contain more than 8 carbon atoms, with the proviso that the number of carbon atoms in all of the side chains must total at least 9; $R_2O$ is an alkylene oxide radical containing at least 2 and not more than 4 carbon atoms selected from the class consisting of ethylene oxide, propylene oxide, butylene oxide, glycide and methylglycide radicals; $n$ is a small whole number varying from 1 to 6; $OC.R_3$ is the acyl radical of a low molal monocarboxy acid having not more than 6 carbon atoms, in which an alpha-hydrogen atom has been removed; and $N:R_4$ represents a radical of a heterocyclic compound of the pyridine series selected from the group consisting of pyridine, quinoline, isoquinoline and C-linked methyl homologs.

2. The process of claim 1, wherein the halogen is chlorine.

3. The process of claim 1, wherein the halogen is chlorine, and $R_3$ is the $CH_2$ radical.

4. The process of claim 1, wherein the halogen is chlorine, $R_3$ is the $CH_2$ radical, and $n$ is 1.

5. The process of claim 1, wherein the halogen is chlorine, $R_3$ is the $CH_2$ radical, $n$ is 1, and $R_2O$ is the ethylene oxide radical.

6. The process of claim 1, wherein the halogen is chlorine, $R_3$ is the $CH_2$ radical, $n$ is 1, $R_2O$ is the ethylene oxide radical, and $N:R_4$ is a pyridinium radical.

7. The process of claim 1, wherein the halogen is chlorine, $R_3$ is the $CH_2$ radical, $n$ is 1, $R_2O$ is the ethylene oxide radical, $N:R_4$ is a pyridinium radical, and at least one side chain of $R_1$ is a butyl radical.

8. The process of claim 1, wherein the halogen is chlorine, $R_3$ is the $CH_2$ radical, $n$ is 1, $R_2O$ is the ethylene oxide radical, $N:R_4$ is a pyridinium radical, and at least one side chain of $R_1$ is an amyl radical.

9. The process of claim 1, wherein the halogen is chlorine, $R_3$ is the $CH_2$ radical, $n$ is 1, $R_2O$ is the ethylene oxide radical, $N:R_4$ is a pyridinium radical, and at least one side chain of $R_1$ is an octyl radical.

MELVIN DE GROOTE.
BERNHARD KEISER.

REFERENCES CITED

The following references are of record in the file of this patent:

UNITED STATES PATENTS

| Number | Name | Date |
|---|---|---|
| 2,243,330 | De Groote et al. | May 27, 1941 |
| 2,255,252 | Harris | Sept. 9, 1941 |
| 2,299,756 | Katzman et al. | Oct. 27, 1942 |
| 2,306,775 | Blair | Dec. 29, 1942 |
| 2,372,257 | De Groote et al. | Mar. 27, 1945 |